(12) United States Patent
Vandemar (10) Patent No.: US 9,264,438 B1
(45) Date of Patent: Feb. 16, 2016

(54) METHOD OF ADVERTISING USING AN ELECTRONIC PROCESSOR AUTHORIZATION CHALLENGE

(71) Applicant: Michael J. Vandemar, Largo, FL (US)

(72) Inventor: Michael J. Vandemar, Largo, FL (US)

( * ) Notice: Subject to any disclaimer, the term of this patent is extended or adjusted under 35 U.S.C. 154(b) by 0 days.

(21) Appl. No.: 14/551,626

(22) Filed: Nov. 24, 2014

Related U.S. Application Data (63) Continuation-in-part of application No. 13/645,900, filed on Oct. 5, 2012, now Pat. No. 9,038,139, which is a continuation of application No. 12/122,628, filed on May 16, 2008, now Pat. No. 8,627,419.

(60) Provisional application No. 60/931,866, filed on May 25, 2007.

(51) Int. Cl.
G06F 7/04 (2006.01)
G06F 21/00 (2013.01)
H04L 29/06 (2006.01)
G06F 3/0484 (2013.01)
G06Q 30/02 (2012.01)

(52) U.S. Cl.
CPC .......... *H04L 63/102* (2013.01); *G06F 3/04845* (2013.01); *G06Q 30/0248* (2013.01); *H04L 63/08* (2013.01)

(58) Field of Classification Search
None
See application file for complete search history.

(56) References Cited

U.S. PATENT DOCUMENTS

| 2004/0230843 A1* | 11/2004 | Jansen | G06F 21/36 726/7 |
| 2005/0138376 A1* | 6/2005 | Fritz | G06F 21/31 713/168 |
| 2007/0250920 A1* | 10/2007 | Lindsay | G06F 21/31 726/7 |
| 2008/0072293 A1* | 3/2008 | D'Urso | G06F 21/31 726/4 |
| 2008/0209223 A1* | 8/2008 | Nandy | G06F 21/36 713/185 |
| 2009/0046856 A1* | 2/2009 | Mitchell | G09C 5/00 380/243 |

* cited by examiner

*Primary Examiner* — Andrew Nalven
*Assistant Examiner* — Abdulhakim Nobahar
(74) *Attorney, Agent, or Firm* — Tiffany C. Miller; Inventions International Inc.

(57) ABSTRACT

A method of advertising using an electronic processor authorization challenge. An advertisement is combined with an authorization key to form an image. An electronic processor disassembles the image and presents the disassembled image to a user by a graphical user interface as an authorization challenge. The authorization challenge can be successfully overcome by a human user reassembling the divided image, then recognizing the authorization key, and then responding to the authorization key. The authorization key is data configured to be inputted into an electronic processor by a human user or data corresponding to a command configured to be performed by a human user. The authorization key can be an advertisement, a feature of an advertisement, a coupon, a CAPTCHA, a Reverse Turing Test, a command, an image, a string of text, a number, a letter, a symbol, a combination of a number, a letter, or a symbol.

20 Claims, 7 Drawing Sheets

METHOD OF ADVERTISING USING AN ELECTRONIC PROCESSOR AUTHORIZATION CHALLENGE

CROSS REFERENCE TO RELATED APPLICATIONS

This application is a continuation-in-part of co-pending U.S. patent application Ser. No. 13/645,900 filed Oct. 5, 2012, entitled, "Multiple Image Reverse Turing Test" which claims priority to U.S. patent application Ser. No. 12/122,628 now U.S. Pat. No. 8,627,419, filed May 16, 2008, entitled, "Multiple Image Reverse Turing Test" which claims priority to U.S. Provisional Patent Application No. 60/931,866, filed May 25, 2007, entitled, "Multiple Image Reverse Turing Test."

FIELD OF THE INVENTION

The present invention relates generally to the field of electronic security methods, and in particular to a method for determining whether an applicant for use of a secured computer, computer system or computer process is a human or is an automated process. More specifically, the invention involves human skills of using a combination of image assembly from individual parts of an advertisement and visual recognition of the assembled advertisement.

BACKGROUND OF THE INVENTION

It is often desirable or necessary to determine if a particular applicant seeking to use an electronic service remotely is in fact a human being and not an automated system. For example, web sites on the Internet offer access for free to humans and want to restrict automated programs (sometimes referred to as "bots") from abusing their system. These web sites need a way to distinguish between a bot and a human. This is often the case in situations where normal human usage would put an acceptable load on a server that automated processes could easily exceed. Additionally, in many cases bots are designed to use computer system services for purposes that they are not intended for, such as mass registering for free email accounts that are then used to send unsolicited advertising.

Currently, a commonly used automated method for making the determination of whether an applicant for access to a secured service or computer system is a human or is a bot is what is known as a Reverse Turing Test (RTT). This can involve presenting the applicant with an image (or a data set convertible into an image), which can, for example, contain either a string of characters or a picture of a readily recognizable object, and having the user identify what is presented in the image. Typically the images presented to the users are distorted in an attempt to make it more difficult for Optical Character Recognition (OCR) software, and other visual recognition programs, to determine what the image is (thereby allowing automated systems to fool the process of identifying whether a user is in fact human). One of the problems being encountered is that as the methods for identifying text and images by computer programs advance, the images must be obfuscated or distorted more and more, increasing the difficulty for a human user to identify the images as well. Therefore a method of increasing the difficulty for a machine or bot to pass an RTT, without increasing the difficulty for a human user, is highly desirable.

Some prior art electronic service providers incorporate advertisements in the margins of the browser or as pop-ups within their database. These advertisements are often unnoticed or are purposely avoided by the user. This results in a loss of revenue to the advertiser that could have been generated from a potential customer. Because advertisement listing fees can be costly for an advertiser, it is more desirable for an advertiser if the advertiser has confirmation that a user has seen and reviewed the targeted advertisement. Thus, there is a need for a more interactive advertisement recognition process to increase a user's awareness of a predetermined advertisement.

SUMMARY OF THE INVENTION

A method of distinguishing a human user from a machine is provided. The method comprises using an algorithm to generate a data set representative of an image containing data that is visually identifiable by a human. The image is divided into multiple sub-images. In a preferred embodiment the data set comprising the sub-images is then communicated to the applicant's computer where all the sub-images are preferably presented simultaneously by means of a graphic user interface (GUI) that provides means to manipulate at least one of the positioning, size, and alignment of the various sub-images. For example, a user can manipulate only the positioning of a sub-image, a user can manipulate only the size of a sub-image, a user can manipulate only the alignment of a sub-image, or user can manipulate any combination of positioning, size, and alignment. This may be done, for example by recourse to a Dynamic Hypertext Markup Language (DHTML) web page, a Flash multimedia program, or a web page written in some future standard of HTML or other web layout language that inherently allows for the user to reposition and manipulate elements contained within it. Through the use of a keyboard, mouse, or similar input device conventionally used with a human user's computer, a human applicant can manipulate the position, alignment, and rotation of the sub-images in such a way that the original image can be reassembled.

A human applicant can reassemble the image and indicate to the security process that he or she recognizes the data. This may be done through actions such as inputting data contained within the reassembled image or by following directions contained within the data. That user interaction is then received and interpreted. A determination of whether the user is a human or not is made based on a comparison between what the user inputs and what data the original image contained.

The additional step of requiring the image to be correctly assembled before identification of the data contained within it can be made adds another level of difficulty that image recognition software would have to overcome in order to trick the system into thinking that a human was attempting to make access. This process, however does not substantially increase the effort a human would encounter. Another aspect of preferred embodiments of the present invention is that a method comprising the recited steps of overlaying data and image, chopping up the image, shuffling the pieces and sending the resultant puzzle to a requestor for solving is a method of controlling access to a computer or service in order to inhibit unauthorized use.

The data set representative of an image containing data includes, but is not limited to, a combination of an advertisement with an authorization key or an advertisement. An advertisement includes, but is not limited to, an image, text, a logo, a coupon, a company service announcement, a product offer, a service offer, a slogan, a public notice, or a paid announcement. The electronic processor selects an advertisement from including, but not limited to, a database of advertisements.

In a preferred embodiment, an advertisement is combined with a Reverse Turing Test to form an image. The image is configured to be divided by an electronic processor having an orientation, whereby, at least one portion of the image is located in a position that is out of alignment with another portion of the image. For example, a side of a first portion of an image is aligned with a side of a second portion of an image to form an aligned image. The image is no longer in alignment when the side of a first portion of an image and a side of a second portion of an image are not connected to each other to form an image. It is within the scope of this invention for only the first portion of an image to be positioned, only the second portion of an image to be positioned, or any combination of the first portion of an image to be positioned and the second portion of an image to be positioned. At least one portion of the image can be separated from the image to form a disassembled image. At least one portion of the disassembled image has a non-contacting position and may overlay a portion of the image. It is within the scope of this invention for the separated portions to be configured to include, but not be limited to, shuffled by the electronic processor.

The image having at least one portion of the image in a divided configuration is presented to a user by a graphical user interface as an authorization challenge. The authorization challenge can be successfully overcome by a human user reassembling the divided image, then recognizing the authorization key, and then responding to the authorization key. It is within the scope of this invention for the authorization key to include, but not be limited to, data configured to be inputted into an electronic processor by a human user or data corresponding to a command configured to be performed by a human user.

The authorization key data includes, but is not limited to, an advertisement, a feature of an advertisement, a coupon, a CAPTCHA, a Reverse Turing Test, a command, an image, a string of text, a number, a letter, a symbol, or a combination of a number, a letter, or a symbol.

It is within the scope of this invention for a command to include, but not be limited to, a challenge, a task, a prompt, instructions, or a stimulus requiring a response from a human user.

In a first embodiment, an image can contain an authorization key and an advertisement. The authorization key can watermark or overlap a portion the advertisement. For example, the authorization key can be fully visible while overlaying the advertisement which is faded in the background of the image. In another example, the advertisement can be fully visible while overlaying the authorization key which is faded in the background. In another example, the authorization key can be located alongside an advertisement, as to not obstruct the advertisement.

In a second embodiment, an image can contain a command and an advertisement. For example, the command could prompt a user to perform a task involving interaction with the advertisement such a clicking on a company logo or inputting the name of a company. This prompt requires a user to locate the advertisement, process the content of the advertisement, and to identify a feature of the advertisement as directed by the command. It is within the scope of this invention for the command to not be located in the image containing the advertisement which is configured to be divided into multiple sub-images. For example, the command could be divided by an electronic processor and reassembled by a human user with the advertisement. The command could be unmodified while the advertisement is divided by an electronic processor and reassembled by a human user.

In a third embodiment, an image can have a command, an advertisement, and authorization key. For example, the command is configured to prompt a user to perform an action upon the authorization key or input information from the authorization key. A user is required to locate the authorization key to successfully perform the authentication challenge as presented in the command. The authorization key is within a close proximity to the advertisement or may be at least a portion of the advertisement itself. It is within the scope of this invention for the command to not be located in the image containing the advertisement which is configured to be divided into multiple sub-images.

In a fourth embodiment, an image can have a command and authorization key being a feature of an advertisement. For example, the command is configured to prompt a user to perform an action upon the authorization key or input data from the authorization key. A user is required to locate the authorization key to successfully perform the authentication challenge as presented in the command. The authorization key is within a close proximity to the advertisement or may be at least a portion of the advertisement itself. It is within the scope of this invention for the command to not be located in the image containing the advertisement which is configured to be divided into multiple sub-images.

In a fifth embodiment, an image has an advertisement. For example, a feature of the advertisement can be inputted into the computer by a human user or a human user can perform an action upon the advertisement as directed by a command.

In a preferred embodiment of a method of a computer determining that an applicant seeking access to a computer is a human applicant, having the steps of selecting by a computer an image comprising human-readable data. The human-readable data has an advertisement and an authorization key. The authorization key could be the advertisement or a feature of the advertisement. The advertisement and the authorization key are oriented within the image by the computer. The computer divides the image into a plurality of separated sub-images. The computer presents the plurality of separated sub-images to an applicant by a graphical user interface. The graphical user interface allows a human applicant to manipulate at least one of a position, an orientation, or a size of at least one of the plurality of separated sub-images, whereby, the plurality of separated sub-images forms a reassembled image having human-readable data.

The human applicant recognizing the authorization key and responds to the authorization key by inputting the authorization key to the computer to be authenticated. The computer verifies that the applicant is a human applicant only if the applicant provides an input responsive to recognition of the authentication key. The computer determines if the applicant is a human applicant. If the response is correct, the human applicant is allowed access to the computer. The computer also determines if the applicant is a human applicant. If the response is incorrect the applicant is denied access to the computer.

The graphical user interface can be a portion of a second computer.

In yet another embodiment, the advertisement can be located on a primary layer and the authorization key can be located on a secondary layer. The primary layer is oriented to overlap at least one portion of the secondary layer.

In an another embodiment, the authorization key can be located on a primary layer and the advertisement can be located on a secondary layer. The primary layer is oriented to overlap at least one portion of the secondary layer.

In another embodiment, the authorization key can be located located adjacent to the advertisement.

In another embodiment, the authorization key is configured to watermark the advertisement.

In another embodiment, the advertisement is configured to watermark the authorization key.

In yet another embodiment, the authorization key can have data configured to be inputted into the computer by a human applicant. The authorization key can be the content of the advertisement, the advertisement itself, a CAPTCHA, text, or a command.

In yet another embodiment, the authorization key can have data corresponding to a command. The command is configured to be performed by a human applicant.

In an embodiment of a method of authenticating a user as human having the steps of providing a segmented image having an advertisement and an authorization key. The advertisement and the authorization key are oriented within the image by an electronic processor. The segmented image has at least a primary portion of the segmented image being positioned in a non-contacting position with a secondary portion. The primary portion of the segmented image has a primary portion boarder. The secondary portion of the segmented image has a secondary portion boarder. The primary portion border is adapted to abut the secondary portion border by a user to orient the primary portion of the segmented image and the secondary portion of the segmented image at a juxtaposed location.

The segmented image is configured to be assembled by a user. The primary portion of the segmented image is adapted to be aligned in a non-overlapping orientation with the secondary portion of the segmented image by the user. At least one of a primary portion of the segmented image or a secondary portion of the segmented image or a combination of both the primary and secondary portion of the segmented image is adapted to be manipulated by the user without the primary portion of the segmented image overlapping the secondary portion of the segmented image to create a non-segmented image.

A user then identifies the authorization key within the non-segmented image. The user input of the authorization key into a graphical user interface is required by the electronic processor. The user is authenticated by the electronic processor as a human. The authentication is based on a comparison between the user input and the authorization key derived from the non-segmented image.

A further embodiment is the authorization key having data configured to be inputted into the computer by a human user.

Another embodiment is the authorization key having data corresponding to a command configured to be performed by a human user.

An embodiment of an electronic processor authorization challenge has the steps of having an electronic processor provide an image having an advertisement and an authorization key. Both the advertisement and the authorization key are configured to be viewed by a user, by a user graphical user interface. The advertisement and the authorization key are placed within the image by the electronic processor. The image has at least two portions that connect to form an image. The electronic processor separates at least one portion of the image from the image to form a disassembled image. The electronic processor presents the disassembled image to the user. The disassembled image is configured to be oriented in a graphical user interface adapted for a human user to manipulate at least one of a position, an orientation, and a size of at least one portion of the disassembled image. The manipulation of at least one portion of the disassembled image forms a reassembled image having an authorization key.

A human user recognizes the authorization key of the reassembled image and responds to the authorization key. An electronic processor verifies that the user is a human user only if the user provides a response correctly corresponding to the authorization key. The electronic processor determines if a user is a human user. If the response is correct, the human user is allowed access to the electronic processor. If the response is incorrect, the user is denied access to the electronic processor.

In another embodiment, the authorization key has data configured to be inputted into a graphical user interface of the electronic processor by a human user.

In another embodiment, the authorization key is data corresponding to a command, whereby, the command is configured to be performed by a human user.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. As noted above, "bot" stands for an algorithmic process that can, to some extent, mimic the behavior of a human seeking access to a service or process furnished by a computer. The words "user" and "applicant" are used more or less interchangeably to denote either a person or a bot seeking access to a computer. Moreover, the phrase "access to a computer" shall stand for any sort of such access including, but not limited to, access to the operating system of a single computer, access to a computer system, access to a process or service operating on one or more computers or to an information service supplied by a computer, regardless of whether it is supplied locally or remotely. Much of the following discussion is couched in terms befitting an internet-based scenario in which an applicant uses a computer to transmit a service request to a remote computer that can grant or deny that request. It will be understood, however, that the methods disclosed herein are not limited to that scenario and do not depend on the details of data transmission. For example, the claimed methods of distinguishing a human applicant from a bot are applicable to a single-computer environment in which the novel method is used to prevent access to a secured program by a viral bot running on the computer. Moreover, those skilled in the art will understand that in the interest of clarity of presentation much of this disclosure is presented in terms of what a human applicant would see on a graphical user interface—i.e., an image or a collection of images—and not in terms of data sets or computer files that a rival bot would process.

Methods of distinguishing a human user from a bot are described. Numerous specific details are set forth in the following description for the purposes of explanation, to aid in a thorough understanding of the present invention. It will be evident, however, to one skilled in the art that the present invention may be practiced without these specific details. It will be appreciated that those skilled in the art will be able to devise various other arrangements, which, although not explicitly described or shown herein, embody the principles of the invention, and are included within its spirit and scope.

Figure 1:
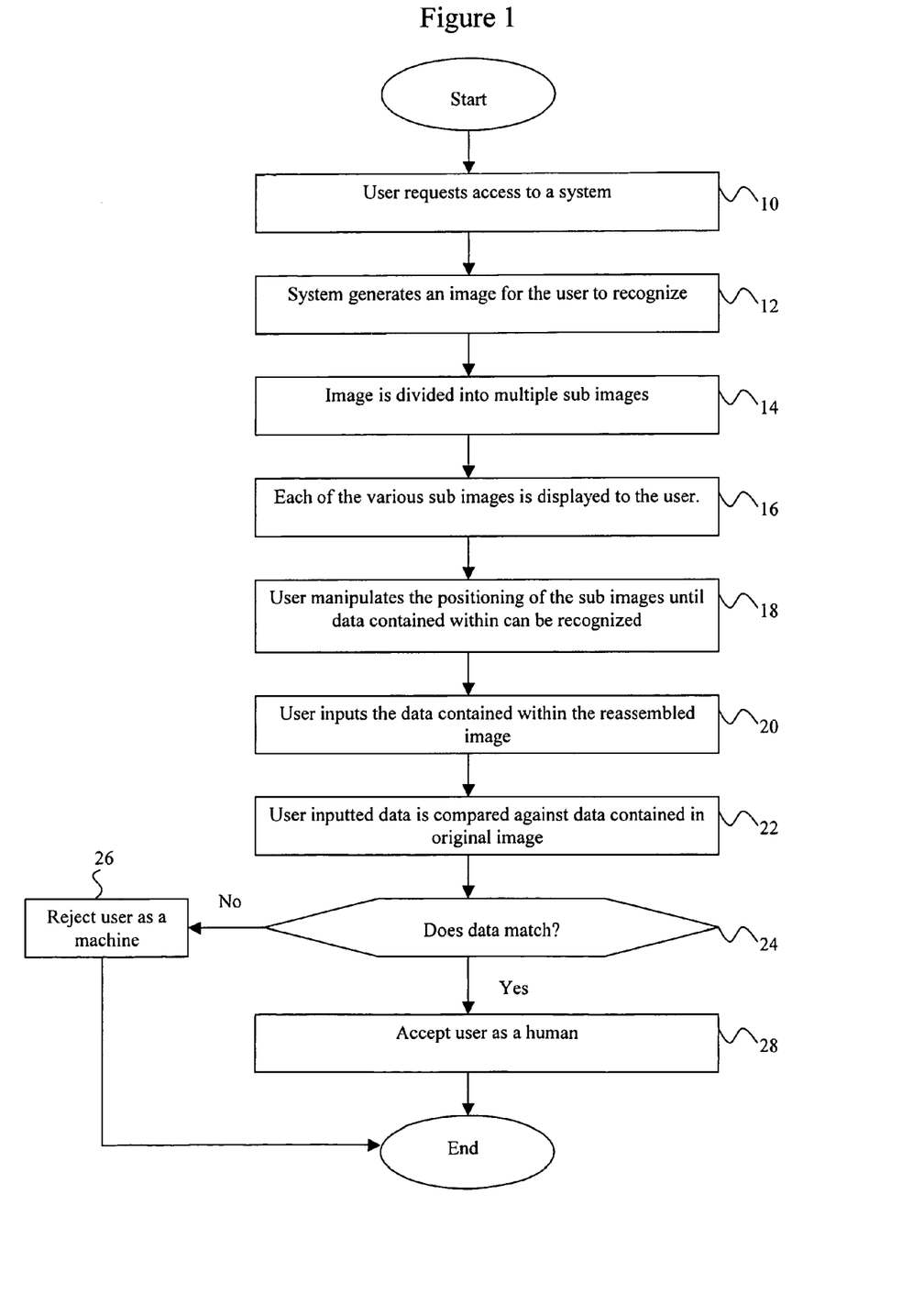
FIG. 1 shows a flowchart of a method for determining whether an applicant is a human or an algorithmic process or bot in accordance with one illustrative embodiment of the present invention.

FIG. 1 shows a flowchart of a method for determining whether a given user is a human or a bot in accordance with one illustrative embodiment of the present invention. In particular, an access request is made by the applicant in step 10. The system generates a data set representative of an image containing reference data in Step 12. This image is divided equally or unequally, with or without rotation, resizing, or inversion into various sub-images (step 14).

The various sub-images are displayed to the user in step 16, generally in a single interface that allows for their position, orientation or size to be individually or collectively manipulated through user input. The sub-images are separated and shuffled, as generally indicated in FIGS. 2-5. Other means of shuffling can include rotating or flipping of the various sub-images along either the x-axis or the y-axis, or resizing of the individual sub-images.

Using available input devices, such as a mouse or other input device attached to a computer, the user arranges the various sub-images until the reference data is evident (step 18). The applicant then inputs that data or responds in such a way indicating that the data contained within the reassembled image is recognized (step 20). The input data or the interaction performed by the user is then compared against the data that was contained within the original image step 22.

The decision as to whether or not the data or interaction received from the user matches the data contained within the original image is made step 24. If the data does not match, then the user is rejected as being a machine or bot (step 26). If the data does match, then the user is accepted as being human (step 28).

Figure 2:
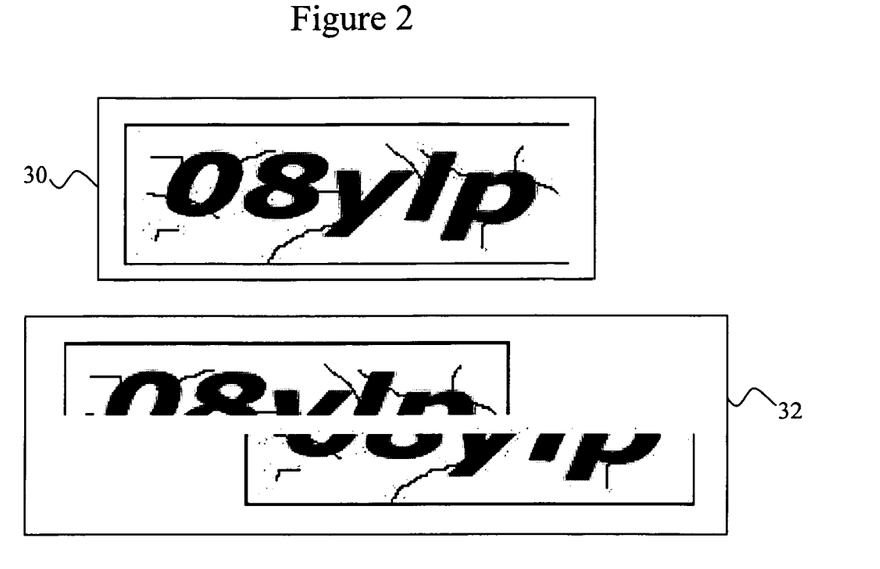
FIG. 2 shows an exemplary method, in accordance with another aspect of the invention, of how a generated image containing human readable reference data might be presented to the user after being divided into upper and lower sections.

FIG. 2 shows an exemplary illustration of an image containing data and that is divided into multiple sub-images which are then presented to the user for reassembly. In particular, the original image contains the data for the user to recognize in step 30. The image is then divided into upper and lower portions in step 32.

These separate sub-images are then presented to the user for reassembly by positioning through drag and drop, which is to say selecting with the mouse, dragging them to another location and releasing the mouse to leave the given sub image in the new location.

In this example the upper sub image is aligned horizontally above the lower sub image by the user, after which the user inputs the data contained within the reassembled image. This inputted data is then compared by the system against the data contained within the original image for purposes of making the determination as to whether the user is human or bot.

Figure 3:
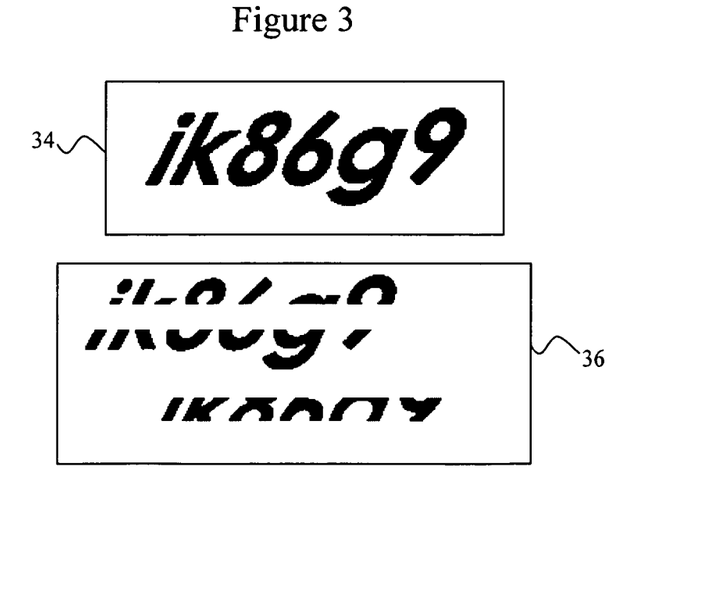
FIG. 3 shows an exemplary method, in accordance with another aspect of the invention, of how a generated image containing reference data might be presented to an applicant after being divided in such a way that the middle section is separated from the remainder of the image.

FIG. 3 shows an exemplary illustration of another method of dividing the original visual data-containing image into multiple sub-images, this time by virtue of using image transparencies. Again, the original image contains the data for the user to recognize in step 34. The image is divided in such a way that the horizontal middle section is removed from the original image, and a copy of that middle section is placed on a new image containing a transparent background step 36.

These separate sub-images are presented to the user for reassembly by positioning the sub image created from the horizontal middle portion of the original image directly over the sub image that has the middle section removed. After reassembly the user inputs the data contained within the reassembled image, the inputted data is then compared by the system against the data contained in the original image in order to determine if the user is human or bot.

Figure 4:
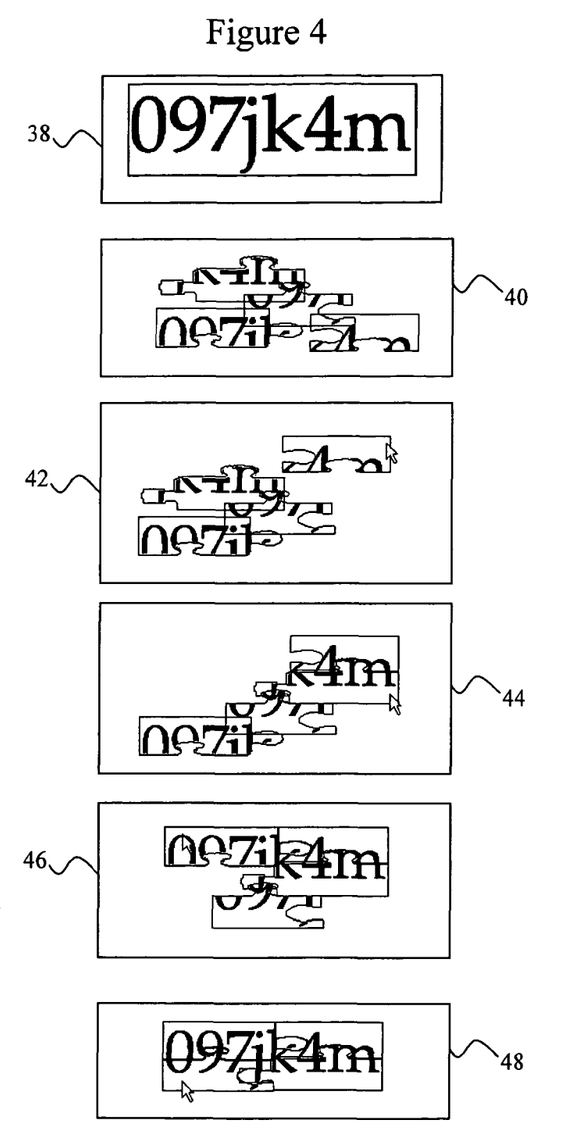
FIG. 4 shows an exemplary method, in accordance with another aspect of the invention, of how a generated image containing reference data might be presented to the user after being divided in such a way that the various sub-images resemble, and fit together as, the irregular pieces of a jigsaw puzzle.

FIG. 4 shows an exemplary illustration of another method of dividing the original visual data-containing image into multiple sub-images, this time through the use of splines or other patterns to create irregularly shaped pieces that fit together to form the whole. In particular, again the original image contains the data for the user to recognize step 38. The image is then divided in such a way that the upper left, upper right, lower left, and lower right sections are separated from one another, and through the use of transparencies an interlocking pattern is associated with each of the sections.

These separate sub-images are presented to the user in a DHTML web page after being shuffled in step 40. Using the mouse to drag and drop the sections, the user positions the upper right (step 42), lower right (step 44), upper left 46, and lower left 48 sub-images so that the data contained within the original image can be seen. After reassembly the user inputs the data contained within the reassembled image, the inputted data then being compared by the system against the data contained in the original image in order to determine if the user is a human or a bot.

Figure 5:
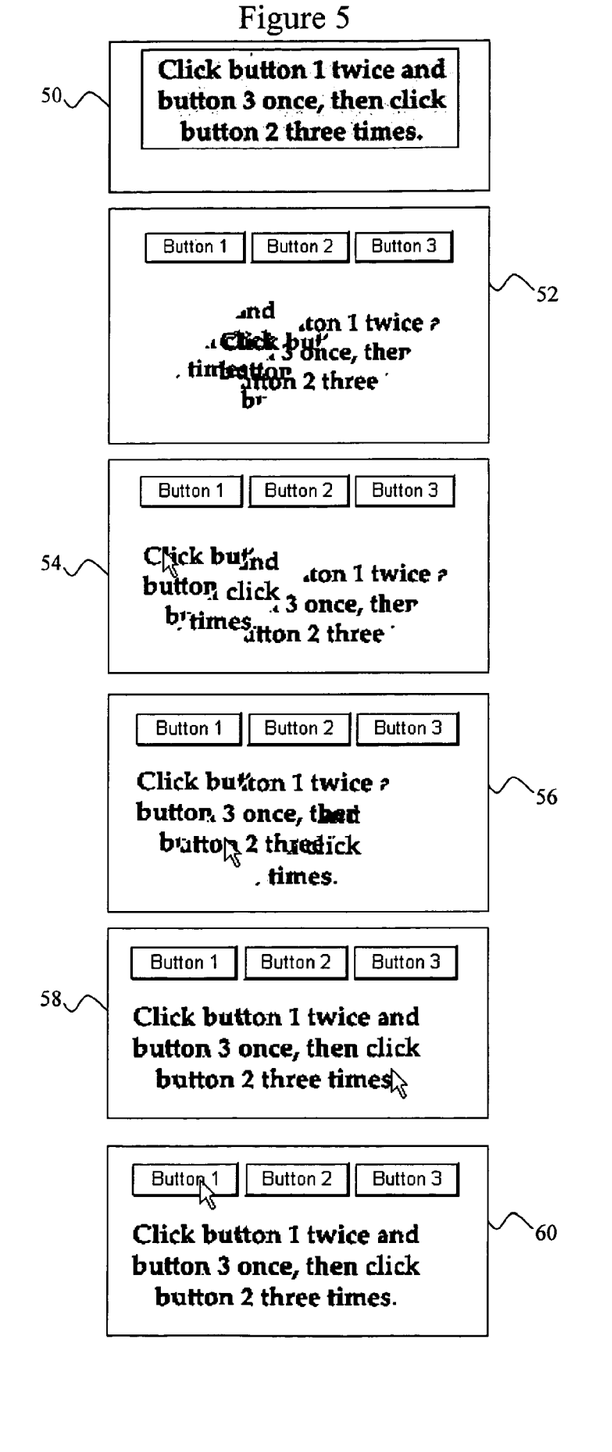
FIG. 5 shows an exemplary method, in accordance with another aspect of the invention, of how a generated image containing reference data, with the reference data being in the form of instructions, might be presented to the user after being divided in such a way that the various sub-images are sliced into diagonal sections.

FIG. 5 shows an exemplary illustration of another method of dividing the original visual data-containing image into multiple sub-images by dividing the image into diagonal slices. In particular, the original image contains instructions for the user to recognize and follow (step 50). The image is then divided in such a way that the left, middle, and right sections are separated from one another into diagonal shapes.

These separate sub-images are presented to the user in a DHTML web page after being shuffled, along with three HTML buttons step 52. Using the mouse to drag and drop the sections, the user positions the left section step 54, middle section step 56, and right section 58 so that the data contained within the original image, in the form of instructions for the user to follow, can be seen.

After reassembly the user follows the instructions contained within the reassembled image 60. The user's actions are then compared by the system against the data contained in the original image in order to determine if the user is human or bot.

Figure 6:
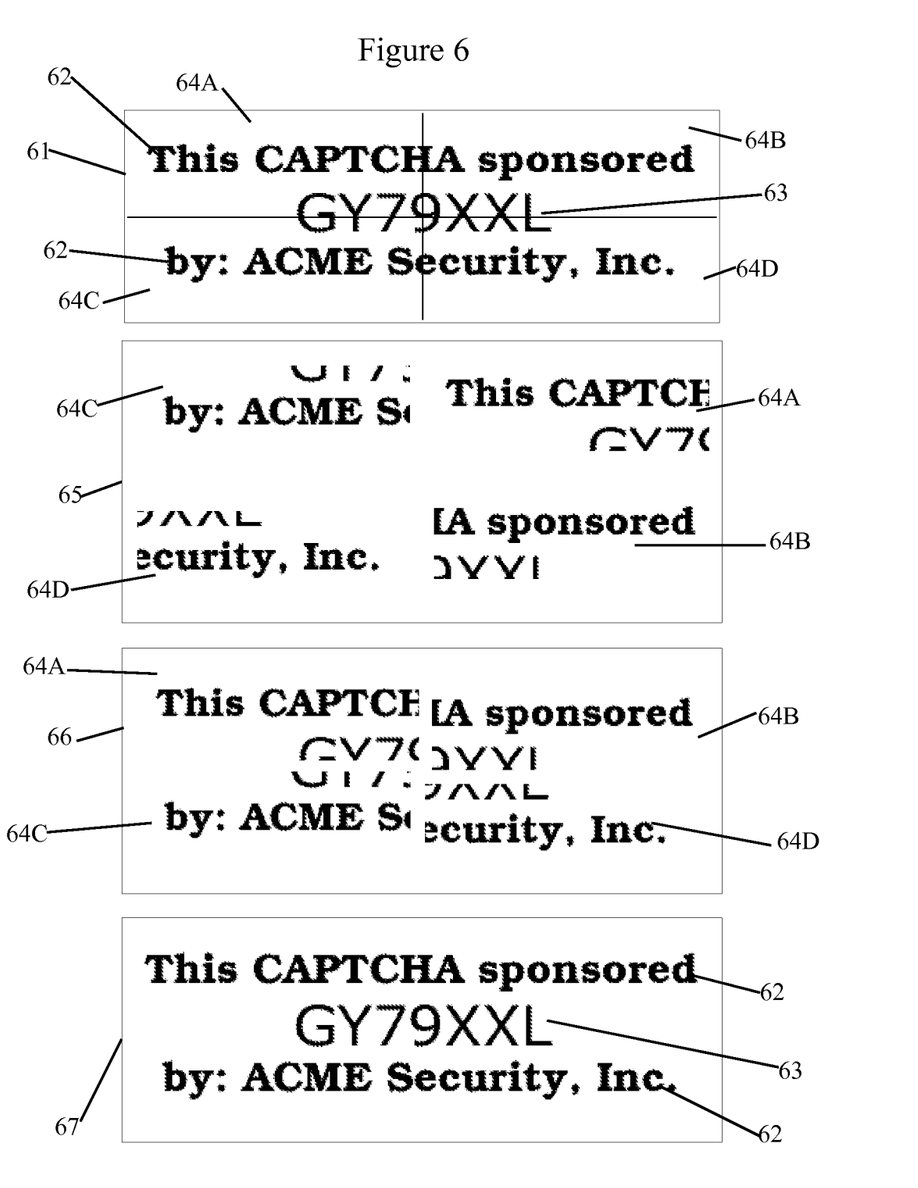
FIG. 6 depicts an embodiment for a method of advertising using an electronic processor authorization challenge having an image being an advertisement and an authorization key.

FIG. 6 depicts image 61. Image 61 contains assembled data. The data of image 61 is advertisement 62 and authorization key 63. In this embodiment Authorization key 63 is a string of text and the string of text is configured to be inputted into an electronic processor (not shown) by a human user (not shown). An electronic processor (not shown) including, but not limited to, a computer, a kiosk, a mobile phone, a laptop, a tablet, or a terminal selects advertisement 62 from an advertisement database and authorization key 63. Image 61 has four sections 64A, 64B, 64C, and 64D. It is within the scope of this invention for image 61 to have at least two sections of data adapted to be divided by an electronic processor.

The electronic processor (not shown) separates at least one section 64A-64D from image 61 which results in image 65. Sections 64A, 64B, 64C, and 64D are separated and shuffled by the electronic processor (not shown). Image 65 is configured to be displayed by the electronic processor (not shown) to a user (not shown).

Sections 64A-64D are configured to be reassembled by a user (not shown) as depicted in image 66.

When the sections 64A-64D are manipulated to be positioned in their respective locations to form an image, as depicted in image 67, advertisement 62 and authorization key 63 can be interpreted by a human user (not shown). The authorization key 63 is configured to be inputted by a human user (not shown) to the electronic processor (not shown) for authentication by the electronic processor (not shown).

Figure 7:
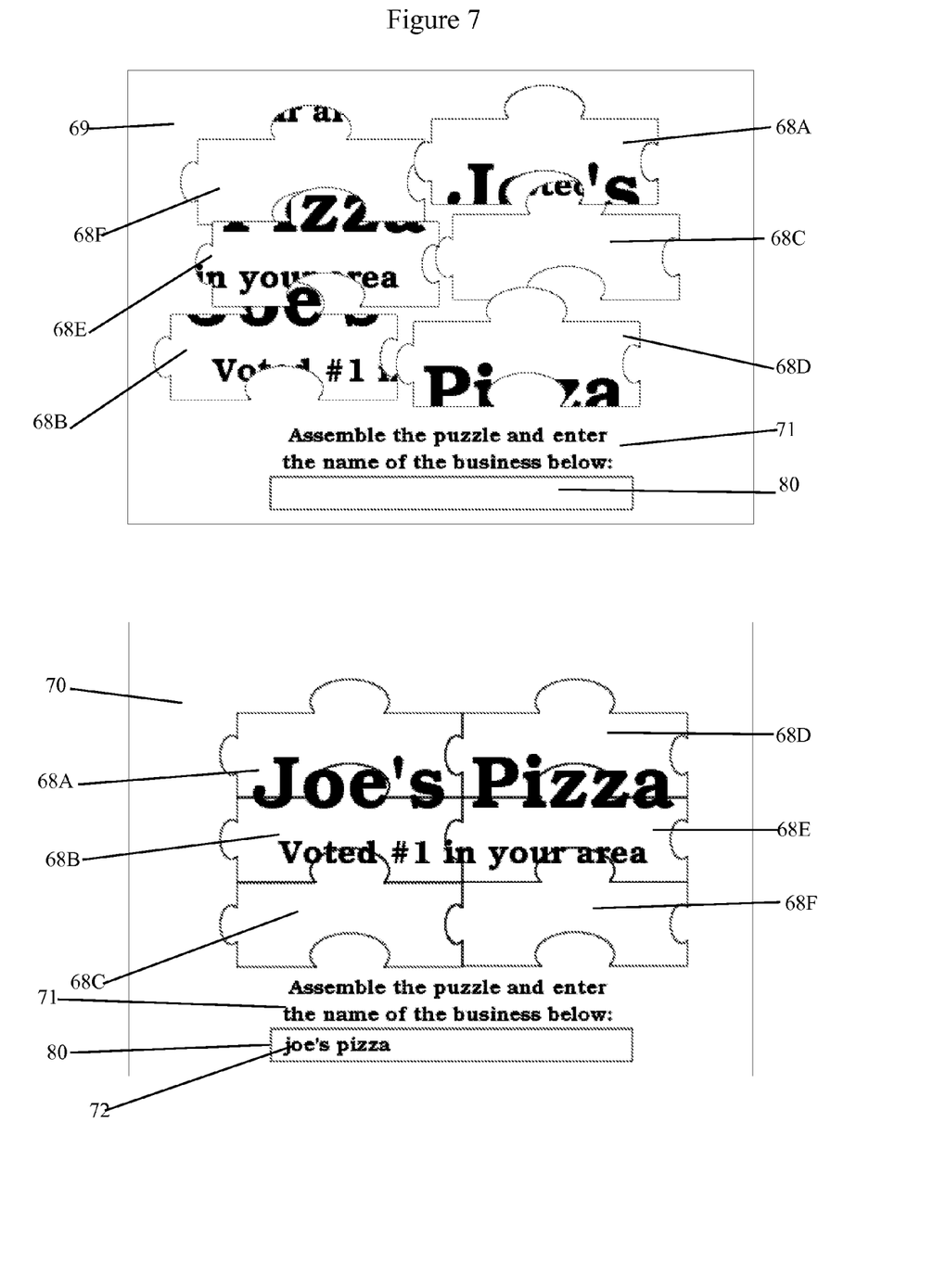
FIG. 7 depicts an embodiment for a method of advertising using an electronic processor authorization challenge having a command and the image being an advertisement with an authentication key being a feature of the advertisement; and, FIG. 8 depicts an embodiment for a method of advertising using an electronic processor authorization challenge having an image with a watermarked advertisement located on a primary layer and an authorization key located on a secondary layer.

FIG. 7 illustrates sections 68A, 68B, 68C, 68D, 68E, and 68F of disassembled advertisement 69 configured to be presented to a user (not shown). Sections 68A-68F are configured to be assembled by a human user (not shown) to form reassembled advertisement 70. Command 71 is configured to prompt a human user (not shown) to input authorization key 72 to electronic processor 80. Authorization key 72 is a feature of reassembled advertisement 70.

Figure 8:
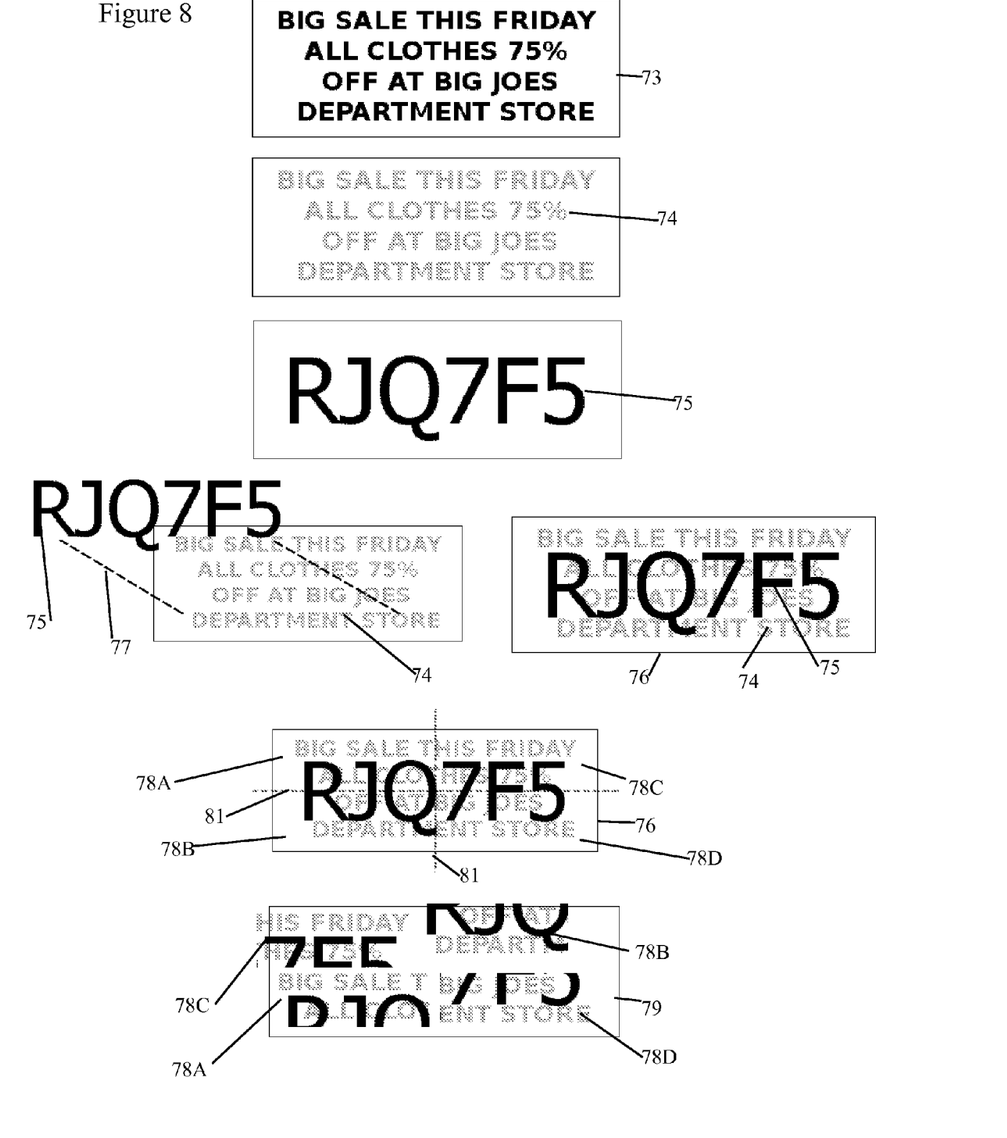

FIG. 8 shows an image having advertisement 73. Advertisement 73 is converted into including, but not limited to, a faded background image or watermark 74 by an electronic processor (not shown). Image 76 shows authorization key 75 is configured to overlay 77 watermarked advertisement 74 by an electronic processor (not shown). It is within the scope of this invention for the authorization key to be faded into the background image as a watermark and the advertisement to appear more prominent and to overlay the authorization key. Image 76 is configured to be divided 81 into sub-images 78A, 78B, 78C, and 78D by an electronic processor (not shown). FIG. 8 illustrates sub-images 78A, 78B, 78C, and 78D are configured to be shuffled by an electronic processor (not shown). Image 79 is configured to be presented to a user (not shown) for re-assembly. Once reassembled, authorization key 74 is identified by a human user (not shown) and inputted into a graphical user interface of an electronic processor (not shown). If the inputted data matches authorization key 74 generated by the electronic processor of image 76, the human user (not shown) is granted access to a system.

Thus, methods of distinguishing a human user from a machine, or bot, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of an electronic processor determining that an applicant seeking access to said electronic processor is a human applicant, the method comprising the steps of:
    selecting by said electronic processor an image comprising human-readable data, whereby, said human-readable data comprising:
    an advertisement; and,
    an authorization key, whereby, said advertisement and said authorization key are oriented within said image;
    dividing by said electronic processor said image into a plurality of separated sub-images;
    presenting by said electronic processor said plurality of separated sub-images to said applicant by a graphical user interface, said graphical user interface allowing said human applicant to manipulate at least one of a position, an orientation, or a size of at least one of said plurality of separated sub-images, whereby, said plurality of separated sub-images forms a reassembled image, said reassembled image having human-readable data;
    said human applicant following the steps comprising of:
    recognizing by said human applicant said authorization key, said human applicant responding to said authorization key by inputting said authorization key to said electronic processor to be authenticated;
    said electronic processor verifying that said applicant is said human applicant only if said applicant provides an input responsive to recognition of said authorization key;
    determining by said electronic processor that said applicant is said human applicant, whereby, if said response is correct to allow access to said electronic processor; and,
    determining by said electronic processor that said applicant is said human applicant, whereby, if said response is incorrect to deny access to said electronic processor.

2. The method of claim 1 wherein said graphical user interface comprises a portion of a second electronic processor.

3. The method of claim 1 wherein said advertisement being located on a first layer and said authorization key being located on a second layer, said first layer is oriented to overlap at least one portion of said second layer.

4. The method of claim 1 wherein said authorization key being located on a first layer and said advertisement being located on a second layer, said first layer is oriented to overlap at least one portion of said second layer.

5. The method of claim 1 wherein said authorization key being located adjacent to said advertisement.

6. The method of claim 1 wherein said authorization key is configured to watermark said advertisement.

7. The method of claim 1 wherein said advertisement is configured to watermark said authorization key.

8. The method of claim 1 wherein said authorization key having data configured to be inputted into said graphical user interface of said electronic processor by said human applicant.

9. The method of claim 8 wherein said authorization key being content of said advertisement.

10. The method of claim 8 wherein said authorization key being said advertisement.

11. The method of claim 8 wherein said authorization key being a CAPTCHA.

12. The method of claim 8 wherein said authorization key being text.

13. The method of claim 8 wherein said authorization key being a command.

14. The method of claim 1 wherein said authorization key is data corresponding to a command, whereby, said command is configured to be performed by said human applicant.

15. A method of authenticating a user as human, comprising the steps of:
   providing a segmented image, said segmented image comprising:
   an advertisement; and,
   an authorization key, whereby, said advertisement and said authorization key are oriented within said image;
   said segmented image having at least a first portion of said segmented image being positioned in a non-contacting position with a second portion, said first portion of said segmented image having a first portion boarder, said second portion of said segmented image having a second portion boarder, said first portion border is adapted to abut said second portion border by said user, thereby, orienting said first portion of said segmented image and said second portion of said segmented image at a juxtaposed location;
   an electronic processor presenting said segmented image to said user by a graphical user interface;
   configuring said segmented image to be assembled by said user within said graphical user interface, whereby, said first portion of said segmented image is adapted to be aligned in a non-overlapping orientation with said second portion of said segmented image by said user, whereby, at least one of said first portion of said segmented image and said second portion of said segmented image are adapted to be positioned by said user without said first portion of said segmented image overlapping said second portion of said segmented image, thereby creating a non-segmented image;
   identifying said authorization key within said non-segmented image by said user;
   requiring said user input of said authorization key; and,
   authenticating said user as human, said authentication based on a comparison between said user input and said authorization key from said non-segmented image.

16. The method of claim 15 wherein said authorization key having data configured to be inputted into said graphical user interface of said electronic processor by said human applicant.

17. The method of claim 15 wherein said authorization key having data corresponding to a command, whereby, said command is configured to be performed by said human applicant.

18. An electronic processor authorization challenge, comprising the steps of:
   said electronic processor providing an image, said image comprising:
   an advertisement; and,
   an authorization key, whereby, said advertisement and said authorization key are oriented within said image by said electronic processor;
   said image comprising:
   at least two portions, said at least two portions connecting to form said image;
   said electronic processor separating at least one portion of said image from said image to form a disassembled image;
   presenting said disassembled image by a graphical user interface of said electronic processor to said user, said graphical user interface adapted for a human user to manipulate at least one of a position, an orientation, and a size of said at least one portion of said disassembled image, whereby, said manipulation of at least one portion of said disassembled image forms a reassembled image, said reassembled image having said authorization key;
   said human user recognizing said authorization key of said reassembled image;
   said human user responding to said authorization key;
   said electronic processor verifying that said user is said human user only if said user provides a response correctly corresponding to said authorization key;
   determining by said electronic processor that said user is said human user, whereby, if said response is correct to allow access to said electronic processor; and,
   determining by said electronic processor that said user is said human user, whereby, if said response is incorrect to deny access to said electronic processor.

19. The method of claim 18 wherein said authorization key having data configured to be inputted into said graphical user interface of said electronic processor by said human user.

20. The method of claim 18 wherein said authorization key having data corresponding to a command, whereby, said command is configured to be performed by said human user.

* * * * *